United States Patent [19]

Hashimoto et al.

[11] Patent Number: 4,955,447
[45] Date of Patent: Sep. 11, 1990

[54] COMPOUND TYPE GUIDING METHOD AND APPARATUS FOR GUIDING MOVEMENT OF A VEHICLE

[75] Inventors: Haruo Hashimoto, Kamakura; Toyoichi Ono, Isehara, both of Japan

[73] Assignee: Kabushiki Kaisha Komatsu Seisakusho, Japan

[21] Appl. No.: 143,999

[22] PCT Filed: Nov. 7, 1986

[86] PCT No.: PCT/JP86/00567
§ 371 Date: Nov. 30, 1987
§ 102(e) Date: Nov. 30, 1987

[87] PCT Pub. No.: WO88/03674
PCT Pub. Date: May 19, 1988

[51] Int. Cl.⁵ .................................................. B60T 7/16
[52] U.S. Cl. ................................. 180/168; 180/169; 318/587; 364/424.04
[58] Field of Search .................. 180/167, 168, 169; 318/135, 581, 587; 310/90.5; 340/988, 825.69; 364/424.04, 443, 449, 450

[56] References Cited

U.S. PATENT DOCUMENTS 4,231,093 10/1980 La Vance et al. ................ 364/443
4,344,498 8/1982 Lindfors ............................. 180/168
4,665,369 5/1987 Faller et al. ....................... 180/168
4,700,301 10/1987 Dyke .................................. 180/169
4,780,817 10/1988 Lofgren ............................. 318/587

FOREIGN PATENT DOCUMENTS 45831 4/1976 Japan .
132189 10/1979 Japan .
148909 8/1984 Japan ................................. 180/168
70618 4/1986 Japan .
1147258 3/1985 U.S.S.R. ............................. 180/168

Primary Examiner—Charles A. Marmor
Assistant Examiner—Eric Culbreth
Attorney, Agent, or Firm—Diller, Ramik & Wight

[57] ABSTRACT

When a vehicle is caused to move under guidance in a working area including a target passage immovable area where a high guiding accuracy is required and a target passage variable area where changing of a moving passage is required, the vehicle is caused to move in accordance with a guiding method with the aid of a guiding line in the target passage immovable area, while the vehicle is caused to move in accordance with a guiding method with the aid of radio wave for measurement in the target passage variable area where the vehicle leaves the guiding line and returns to the same.

3 Claims, 4 Drawing Sheets

COMPOUND TYPE GUIDING METHOD AND APPARATUS FOR GUIDING MOVEMENT OF A VEHICLE

TECHNICAL FIELD

The present invention relates to compound type guiding method and apparatus for automatically guiding movement of a vehicle.

BACKGROUND ART

Heretofore, as a method of automatically guiding the movement of a moving body there are already known ① a guiding method with the aid of a guiding line, ② a guiding method with the aid of the dead reckoning and ③ a guiding method with the aid of measurement using radio wave.

Features of these guiding methods are noted in the following table.

TABLE 1

| method of guiding | advantage | disadvantage | example of application |
|---|---|---|---|
| ① guiding line | (1)Measuring accuracy relative to position and direction is highest among three methods. | (1)Due to need of laying the guiding line, it is difficult to deal with variation of a working area. | unmanned conveyance |
| ② dead reckoning | (1)There is no need of arrangment of any outside reference and an apparatus can be designed in a compact structure. (2)Variation of a working area can be easily dealt with. | (1)There are accumulative error and acceleration error and it is difficult to apply it to a vehicle. | aircraft ship |
| ③ measurement with the use of radio wave | (1)Accuracy is kept constant regardless of distance of measurement. (2)Since it is not affected by acceleration, it can be easily applied to vehicle. (3)Variation of a working area can be easily dealt with. | (1)There is need of installing an oscillator on the ground (outside a working area). (2)It can be used only within a scope of visible distance. | ship |

With respect to the guiding of the movement of a vehicle, the method ① is the best but this method requires that the guiding line is relocated in the case where a working area varies. Accordingly, it is difficult to employ the method in the case where a working area varies occasionally.

On the other hand, the method ③ which can be utilized for ship can satisfactorily deal with variation of a working area but its guiding accuracy is considerably lower than that of the method ①.

The present invention has been made while taking into account the fact that the guiding method with the aid of a guiding line is excellent in guiding accuracy and the guiding method with the use of radio wave for measurement is excellent in versatility of variation of a working area and its object resides in providing compound type guiding method and apparatus which assure that advantages of the aforesaid methods can be effectively exhibited when movement of a vehicle is guided in a certain special working area.

DISCLOSURE OF THE INVENTION

According to one aspect of the present invention there is provided a method of guiding the movement of a vehicle in a working area including a target passage immovable area where a high guiding accuracy is required and a target passage variable area where changing of a moving passage is required, characterized in that the vehicle is caused to move in accordance with a guiding method with the aid of a guiding line in the target passage immovable area and the vehicle is caused to move in accordance with a guiding method with the aid of radio wave for measurement in the target passage variable area where the vehicle leaves the guiding line and then returns to the guiding line again.

Further, according to other aspect of the present invention there is provided an apparatus for guiding the movement of a vehicle in a working area including a target passage immovable area where a high guiding accuracy is required and a target passage variable area where changing of a moving passage of the vehicle is required, characterized in that said apparatus comprises a guiding line for generating a magnetic field for the purpose of guiding, the guiding line being laid in the target passage immovable area where a high guiding accuracy is required, a main station for the purpose of measurement with the use of radio wave, two substations for the purpose of measurement with the use of radio wave, both the main station and the two substations being located in a predetermined positional relation, a plurality of pickup coils for detecting the magnetic field generated by the guiding line for the purpose of guiding, the pickup coils being mounted on the vehicle, first steering command generating means for generating a command for the purpose of steering the vehicle in response to output transmitted from the pickup coils, receiving means for receiving radio wave from the main station and the two substations, the receiving means being mounted on the vehicle, vehicle position detecting means for detecting the existent position of the vehicle with reference to a difference in time when each radio wave is received by the receiving means, storing means for storing at least one or a plurality of movement passages along which the vehicle leaves the guiding line and returns to the guiding line, second steering command generating means for generating a command for the purpose of steering the vehicle with reference to the existent position of the vehicle which is read out by the vehicle position detecting means and the existent moving passage which is read out by the storing means, selecting means for selecting either one of the steering commands issued from the first steering command generating means and from the second steering command generating means and steering means for steering the vehicle in accordance with the steering command selected by the selecting means.

BEST MODE FOR CARRYING OUT THE INVENTION

Figure 1:
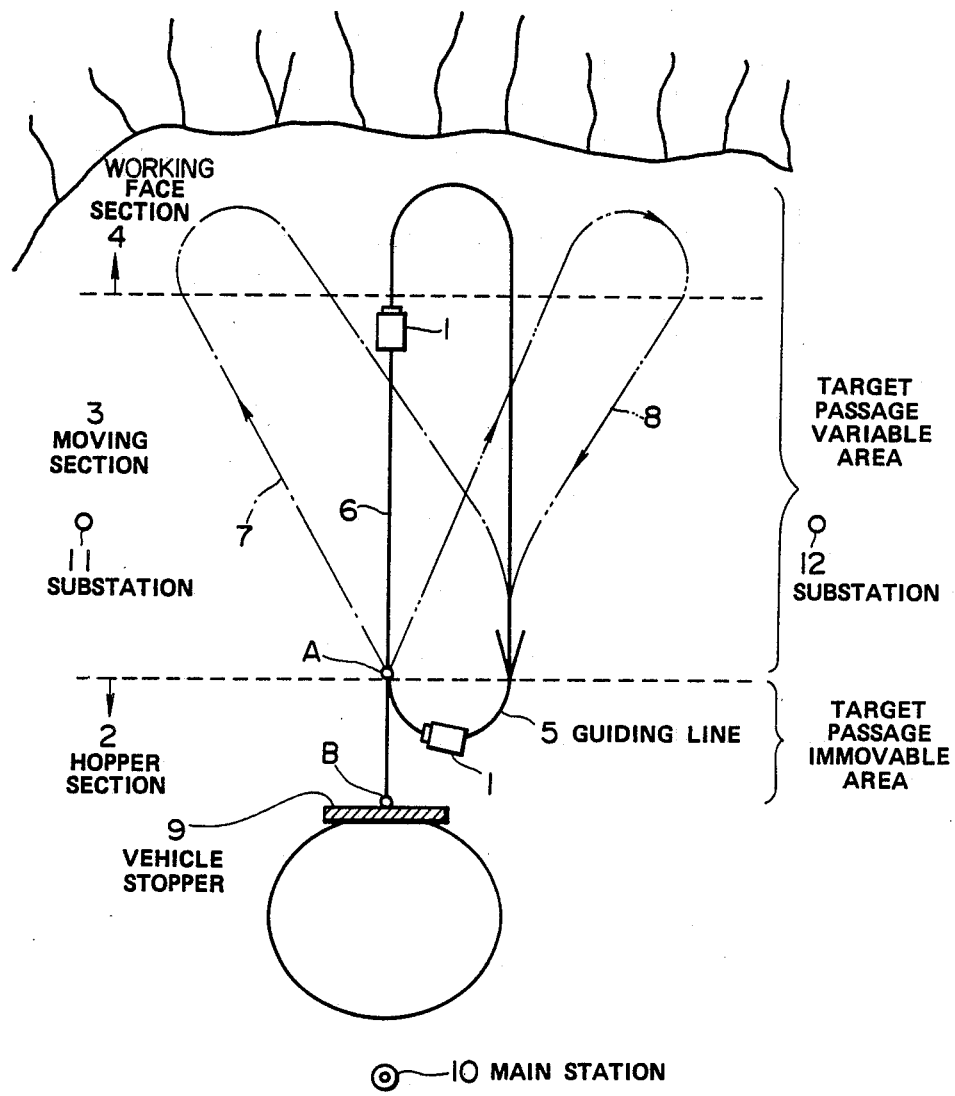
FIG. 1 is a schematic view illustrating an example of a working area to which the present invention is applied.

FIG. 1 is a schematic view illustrating an example of a working site to which the present invention is applied. This working site is divided into a hopper section 2, a moving section 3 and a working face section 4. A vehicle 1 moves via the moving section 3 from the hopper section 2 as a starting point where a load is unloaded to the working face section 4 where the loading operation is performed. After a load, such as earth, rock or the like, is loaded on the vehicle 1 with the use of another loading vehicle, it returns to the hopper section 2 again where the aforesaid load is unloaded.

Here, the hopper section 2 is a target passage immovable area where a high guiding accuracy is required with respect to the vehicle 1, and a guiding line 5 is laid in this hopper section 2. The moving section 3 and the working face section 4 are a target passage variable area where the moving passage of the vehicle 1 is varied due to variation of a loading point on the vehicle 1, as represented by a solid line 6, a one-dot chain line 7 and a two-dot chain line 8.

Immovable stations for the purpose of measurement of radio waves (main station 10, substation 11 and substation 12) which will be described later are provided at a properly determined position where a man can visually recognize the vehicle 1 wherein the aforesaid position is located outside the target passage immovable area and the target passage variable area where the vehicle 1 can move.

Figure 2:
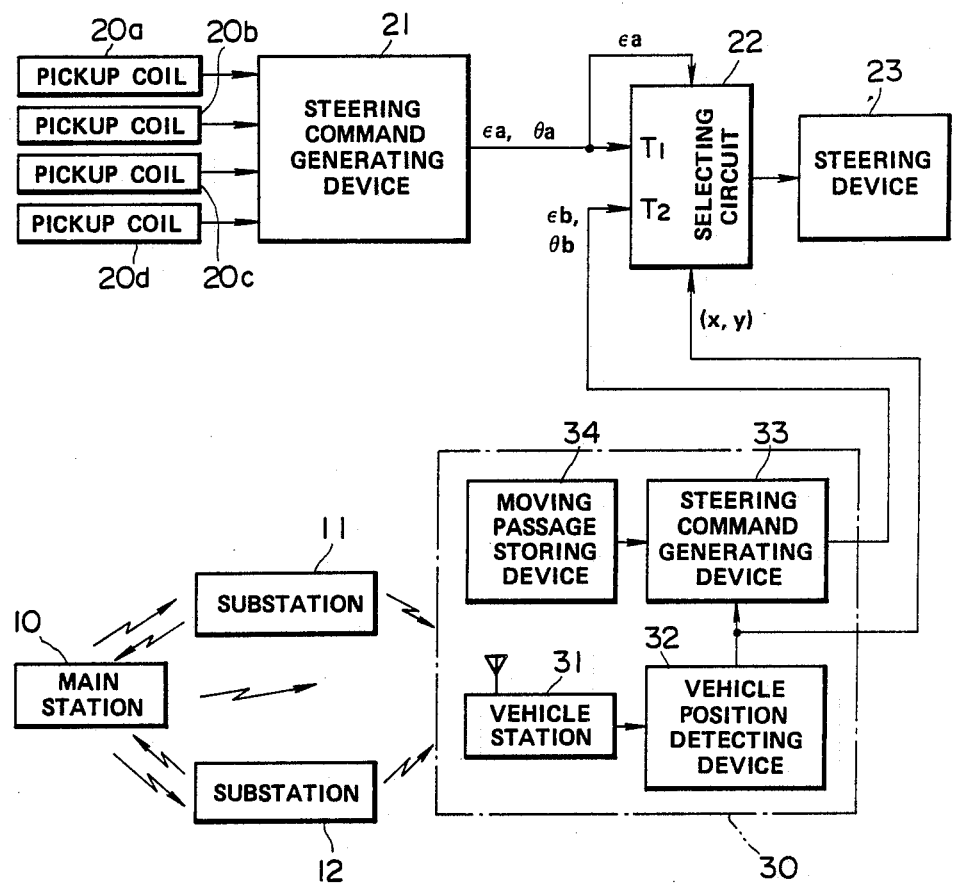
FIG. 2 is a block diagram illustrating a guiding apparatus in accordance with an embodiment of the present invention.
Figure 3:
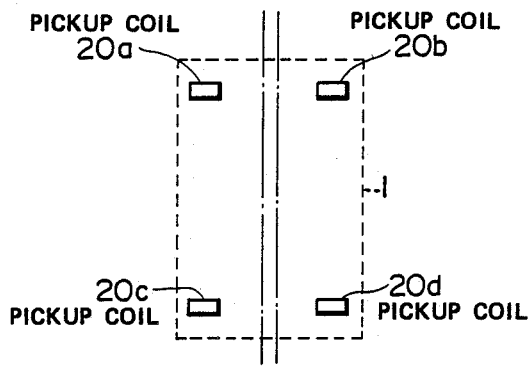
FIGS. 3 and 4 are views which depict the guiding method utilizing a guiding line.
Figure 4:
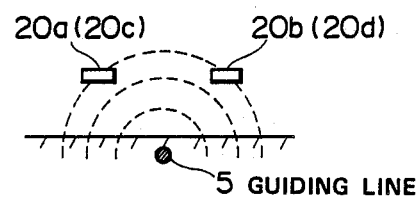
Figure 5:
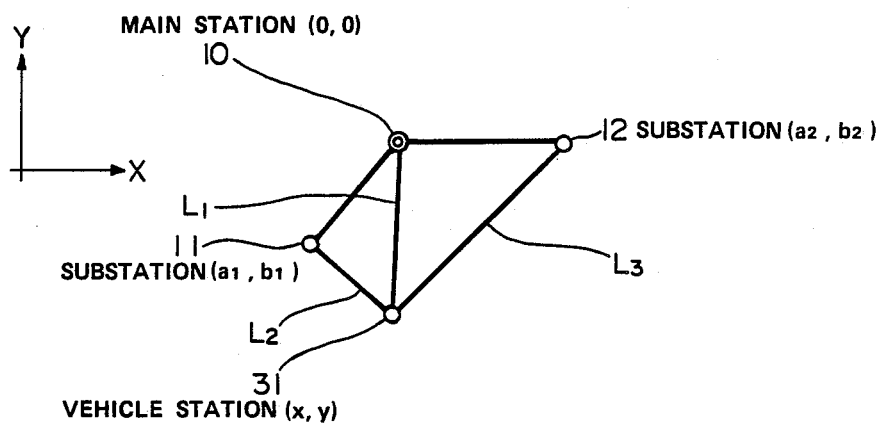
FIG. 5 is a view which depicts the guiding method utilizing radio wave for measurement.

FIG. 2 is block diagram illustrating a guiding apparatus in accordance with an embodiment of the present invention. In the drawing four pickup coils 20a, 20b, 20c and 20d are placed at a positional relation relative to the vehicle 1, as shown in FIG. 3. These pickup coils detect a magnetic field generated by the guiding line 5, as shown in FIG. 5 (see FIG. 4), and a signal corresponding to an intensity of magnetic field is then transmitted to a steering command generating device 21.

The steering command generating device 21 detects an extent of deviation of the vehicle 1 from a proper course relative to the guiding line 5 and a posture angle of the vehicle 1 with reference to a difference in detected output between the pickup coils 20a and 20b and a difference in detected output between the pickup coils 20c and 20d and then generates a steering command $\epsilon_a$ and $\theta_a$ representative of the aforesaid extent of deviation from the proper course and the aforesaid posture angle.

On the other hand, a station 31 mounted on the vehicle receives a radio wave for the purpose of measurement which is sent from the main station 10 and the substations 11 and 12. Then, a difference in time $\Delta t_1$ of radio wave reaching to the vehicle station 31 from the main station 10 and the substation 11 and a difference in time $\Delta t_2$ of radio wave reaching to the vehicle station 31 from the main station 10 and the substation 12 are obtained and they are then introduced into the vehicle position detecting device 32. The vehicle position detecting device 32 calculates the existent position of the vehicle 1 with reference to these time differences to $\Delta t_1$ and $\Delta t_2$.

Incidentally, the aforesaid time differences $\Delta t_1$ and $\Delta t_2$ are measured, for instance, by simultaneously sending pulse signals from the main station 10 and the substations 11 and 12. It should, of course be noted that it is possible to measure the aforesaid time differences $\Delta t_1$ and $\Delta t_2$ with reference to a difference in phase of signal radio waves having the same phase wherein the signal radio wave is continuously sent from each of the stations 10, 11 and 12 and received by the vehicle station 31.

Now, description will be made below as to a principle of measurement with the use of radio wave with reference to FIG. 5. When it is assumed that the main station 10 and the substations 11 and 12 are provided at known positions, for instance, the main station 10 is placed at the position (0, 0), the substation 11 is placed at the position $(a_1, b_1)$ and the substation 12 is placed at the position $(a_2, b_2)$ while the vehicle station 31 is located at the position (x, y), a difference $\Delta L_1$ between a distance $L_1$ between the main station 10 and the vehicle station 31 and a distance $L_2$ between the substation 31 and the substation 11 and a difference $\Delta L_2$ between the aforesaid distance $L_1$ and a distance $L_3$ between the vehicle station 31 and the substation 12 can be represented by the following formula.

$$\Delta L_1 = \sqrt{x^2 + y^2} - \sqrt{(x - a_1)^2 + (y - b_1)^2} \quad (1)$$

$$\Delta L_2 = \sqrt{x^2 + y^2} - \sqrt{(x - a_2)^2 + (y - b_2)^2}$$

It should be noted that the aforesaid time differences $\Delta t1$ and $\Delta t2$ correspond to $\Delta L1$ and $\Delta L2$ in the proportional relationship respectively.

When the time differences $\Delta t1$ and $\Delta t2$ are measured, the differences $\Delta L1$ and $\Delta L2$ are obtained by multiplying the time differences with a proportional constant. Thus, the position (x, y) of the vehicle station 31, that is, the position of the vehicle 1, can be obtained from the formula (1) and the differences $\Delta L1$ and $\Delta L2$.

The vehicle position detecting device 32 obtains the existent position ( x, y ) of the vehicle 1 in the above-described manner and a signal indicative of the aforesaid position is then transmitted to a steering command generating device 33.

A moving passage storing device 34 previously stores a plurality of moving passages, for instance, moving passages as represented by the real line 6, the one-dot chain line 7 and the two-dot chain line 8 in FIG. 1. Incidentally, these moving passages are at least a passage along which the vehicle leaves the guiding line 5 and returns to the guiding line 5 again via a certain loading position. The moving passage storing device 34 issues to a steering command generating device 33 a signal indicative of any one moving passage which is selected from the aforesaid plurality of moving passages with the aid of suitable means.

The steering command generating device 33 detects an extent of deviation of the vehicle 1 from a proper course and a posture angle of the vehicle 1 relative to the stored moving passage with reference to signals transmitted from the vehicle position detecting device 32 and the moving passage storing device 34 and then generates steering commands $\epsilon_b$ and $\theta_b$ indicative of the aforesaid extent of deviation from a proper course and the aforesaid posture angle. Incidentally, the posture angle of the vehicle 1 relative to the previously stored moving passage is obtained, for instance, by obtaining the direction of movement of the vehicle with reference to the existent position of the vehicle and the position of the vehicle just behind the first-mentioned position and then obtaining an angle determined by the direction of movement and the previously stored moving passage.

A selecting circuit 22 is adapted to select either one of steering command $\epsilon_a$ and $\theta_a$ transmitted from the steering command generating device 21 to an input terminal $T_1$ and steering command $\epsilon_b$ and $O_b$ transmitted from the steering command generating device 33 to an input terminal $T_2$ and then output it to a steering device 23. In the case where the vehicle 1 is guided by means of the guiding line 5, steering command on the input terminal $T_1$ side is selected and outputted, while in the case where the vehicle 1 is guided by measurement of radio wave, steering command on the input terminal $T_2$ side is selected and outputted. Namely, by carrying out selecting and outputting in that way, shifting is effected between the moving passage along the guiding line 5 and the moving passage previously stored in the storing device 34.

Now, the shifting of passages performed by the selecting circuit 22 will be described.

The selecting circuit 22 is supplied with a signal representing the current position (x, y) of the vehicle 1 from the vehicle position detecting device 32. Suppose now that the vehicle 1 is currently being guided by means of the guide line 5. Then, the steering commands $\epsilon_a$ and $\theta_a$ inputed through the input terminal T1 are being selected, which are supplied to the steering device 23. When the selecting circuit 22 judges that the vehicle 1 reaches a passage shifting point A shown in FIG. 1 based on the current vehicle position (x, y), it selects the steering commands $\epsilon_b$ and $\theta_b$ inputted through the input terminal T2 and outputs the selected command to the steering device 23. Thus, the vehicle now runs along one of the moving passages 6-8 in FIG. 1.

Figure 6:
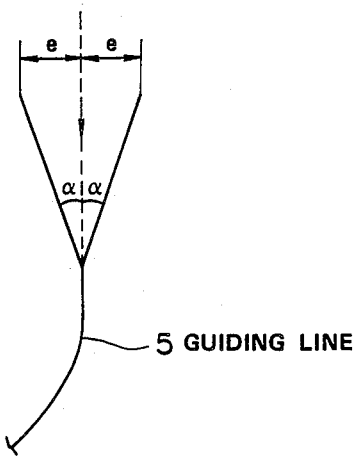
FIG. 6 is an enlarged view illustrating a shifting area, as shown in FIG. 1.

Referring to FIG. 6, the event that the vehicle running along one of the moving passages 6-8 is shifted to run along the guide line 5 will now be described.

FIG. 6 is an enlarged fragmental view illustrating a shifting section where the vehicle is shifted to run from one of the moving passages 6-8 to the passage along the guiding line 5. In the shifting section, the guiding line 5 is branched in V-shape. The foremost end of the V-shaped branches are deviated from the moving passage by e. These branches form an angle of $\alpha$ with respect to the moving passage. The deviation e is set to be the maximum measurement error created by the radio wave measurement and the angle $\alpha$ is the maximum steering angle of the vehicle 1.

With such construction of the shifting section, even though the vehicle 1 runs deviating from the moving passage due to the measurement error in the radio wave measurement, it is assured that the vehicle is shifted to run along the guide line 5.

When the selecting circuit 22 judges that the vehicle 1 reaches the shifting section based on the position of the vehicle 1 which is detected by the position detecting device 32, the vehicle 1 is shifted to run from being guided by the radio wave measurement to being guided with the aid of the guiding line 5.

The steering device 23 controls an extent of steering of the vehicle 1 with reference the extent of deviation of the vehicle from a proper course and the posture angle of the vehicle transmitted from the selecting circuit 22 in order that both the extent of deviation of the vehicle from a proper course and the posture angle of the vehicle become zero.

Incidentally, after shifting is achieved from guiding of the vehicle 1 by measurement with the use of radio wave to guiding of the vehicle 1 along the guiding line 5, the vehicle 1 moves forwardly to a positional point A, it moved linearly rearwardly from the positional point A to a positional point B which is located just before a vehicle stopper 9 and it moves forwardly again from the vehicle stopper 9 after completion of unloading, as shown in FIG. 1. Movement of the vehicle 1 from the positional point A is shifted to movement of the same under guidance by measurement with the use of radio wave. However, command to the vehicle 1 at each positional point (forward movement, stoppage, rearward movement, vessel operation or the like) can be given by known suitable means, for instance, specific point located on the guiding line, sign, post or the like means.

Figure 7:
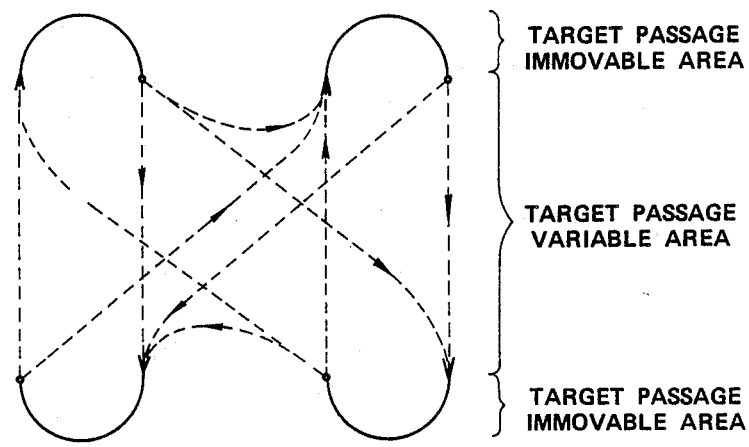
FIG. 7 is a view illustrating guiding lines and preset moving passages in accordance with another embodiment of the present invention.

Further, a moving passage of the vehicle 1 along the guiding line 5 and a preset moving passage of the same under guidance by measurement with the use of radio wave extending from the guiding line 5 and returning to the same again are not limited to the above-described embodiment. For instance, as shown in FIG. 7, a moving passage of the vehicle may comprise passages along a plurality of guiding lines (as identified by real lines) and moving passages under guidance by measurement with the use of radio wave (as identified by dotted lines) wherein the last-mentioned moving passage extends from one guiding line to another guiding line. It should of course be noted that vehicle is not limited only to carrying vehicle.

In the illustrated embodiment, the vehicle is equipped with a vehicle position detecting device 32 for detecting a position of the vehicle by measurement with the use of radio wave, a moving passage storing device 34 and a steering command generating device 33, as shown in FIG. 2 but the present invention is not limited only to this. Alternatively, for instance, a part 30 surrounded by one-dot chain lines 30 may comprise only a station 31 mounted on the vehicle and a communication control device and moreover means for issuing steering command to the vehicle by radio wave in order that the vehicle moves on a properly determining moving passage by making a communication between the office side and the vehicle station to detect the existent position of the vehicle may be provided. When this type of embodiment is employed, it becomes possible to change moving passage and moving schedule within a given period of time during movment of the vehicle. Thus, a man can quickly deal with requirement for changing of moving conditions due to variation of working environment such as existence of certain obstacles or the like.

INDUSTRIAL APPLICABILITY

As is apparent from the above description, the present invention provides highly practicable guiding of a vehicle including both a high guiding accuracy that is an advantage inherent to a method of guiding movement of the vehicle along a guiding line and a versatility relative to a moving passage that is an advantage inherent to a method of guiding movement of the vehicle by measurement with the use of radio wave.

We claim:

1. A compound guiding apparatus for guiding the movement of a vehicle, characterized in that said apparatus comprises a guiding line for generating a magnetic field for the purpose of guiding movement of said vehicle, said guiding line being laid in a target passage immovable area where a high guiding accuracy is required, a main station for emitting radio wave for the purpose of measurement with the use of radio wave, two substations for emitting radio wave for the purpose of measurement with the use of radio wave, said main station and said two substations being located in a predetermined positional relation, a plurality of pickup coils for detecting a magnetic field for the purpose of guiding movement of the vehicle, said magnetic field being generated by means of a guiding line, said pickup coils being mounted on the vehicle, first steering command generating means for generating a steering command for the purpose of steering the vehicle in response to an output from the pickup coils, receiving means for receiving radio wave emitted from the main station and the two substations, said receiving means being mounted on the vehicle, vehicle position detecting means for detecting the existent position of the vehicle with reference to a difference in time when each receiving means receives radio wave, storing means for storing moving passages along which the vehicle leaves the guiding line and returns to the same, second steering command generating means for generating a steering command for the purpose of steering the vehicle with reference to the existent position of the vehicle which is read out by said vehicle position detecting means and the moving passage which is read from said storing means, selecting means for selecting either one of a steering command issued from said first steering command generating means and a steering command issued from said second steering command generating means and steering means for steering the vehicle in accordance with a steering command which is selected by said selecting means.

2. The guiding apparatus as defined in claim 1 wherein said selecting means selects a steering command issued from said first steering command generating means when said vehicle position detecting means detects a position of a beginning point of said guide line, and selects a steering command issued from said second steering command generating means when said vehicle position detecting means detects a position of an ending point of said guide line.

3. The guiding apparatus as defined in claim 1 wherein said guide line is formed at a beginning point thereof in a V-shape whereby said vehicle is easily moved on to said guide line.

* * * * *